US011607903B2

United States Patent
Franco

(10) Patent No.: US 11,607,903 B2
(45) Date of Patent: *Mar. 21, 2023

(54) MICRO-SUCTION REUSABLE AND REPOSITIONABLE WRITING SURFACES

(71) Applicant: COMSERO, INC., Thornton, CO (US)

(72) Inventor: Anthony Franco, Broomfield, CO (US)

(73) Assignee: Comsero, Inc., Thornton, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/523,402

(22) Filed: Nov. 10, 2021

(65) Prior Publication Data
US 2022/0063324 A1 Mar. 3, 2022

Related U.S. Application Data

(63) Continuation of application No. 16/112,630, filed on Aug. 24, 2018, now Pat. No. 11,179,964.
(Continued)

(51) Int. Cl.
| | |
|---|---|
| B43L 1/00 | (2006.01) |
| B43L 3/00 | (2006.01) |
| B43L 1/12 | (2006.01) |
| B32B 5/18 | (2006.01) |
| B32B 27/06 | (2006.01) |
| B32B 7/12 | (2006.01) |
| B32B 37/12 | (2006.01) |
| B32B 38/00 | (2006.01) |
| B32B 5/32 | (2006.01) |

(52) U.S. Cl.
CPC .................. *B43L 1/00* (2013.01); *B32B 5/18* (2013.01); *B32B 7/12* (2013.01); *B32B 27/065* (2013.01); *B32B 37/12* (2013.01); *B32B 38/004* (2013.01); *B43L 1/126* (2013.01); *B43L 3/004* (2013.01); *B43L 3/008* (2013.01); *B32B 5/32* (2013.01); *B32B 2255/102* (2013.01)

(58) Field of Classification Search
CPC . B32B 2255/102; B32B 27/065; B32B 37/12; B32B 38/004; B32B 5/18; B32B 5/32; B32B 7/12; B43L 1/00; B43L 1/126; B43L 3/004; B43L 3/008
See application file for complete search history.

(56) References Cited

U.S. PATENT DOCUMENTS

| | | |
|---|---|---|
| 3,110,917 A | 11/1963 | McPeek, Jr. |
| 3,529,799 A | 9/1970 | Schaefer |
| (Continued) | | |

OTHER PUBLICATIONS

U.S. Patent and Trademark Office, Non-Final Office Action dated Nov. 30, 2018, in U.S. Appl. No. 16/138,487, 6 pages.

*Primary Examiner* — Hai Vo

(74) *Attorney, Agent, or Firm* — Talus Law Group LLC

(57) ABSTRACT

A re-useable writing surface reusably and removably coupled to exterior surfaces is disclosed. The re-useable writing surface may include a porous layer. The porous layer may define one or more cells. The re-usable writing surface may further include a non-adhesive coating applied to a side of the porous layer. The re-useable writing surface may further include a writeable layer coupled to a different side of the porous layer. The writeable layer may be configured to allow a user to draft and erase content. The non-adhesive coating can enable the re-useable writing surface to reusably and removably couple to exterior surfaces.

10 Claims, 4 Drawing Sheets

Related U.S. Application Data

(60) Provisional application No. 62/561,568, filed on Sep. 21, 2017, provisional application No. 62/561,570, filed on Sep. 21, 2017, provisional application No. 62/561,581, filed on Sep. 21, 2017, provisional application No. 62/561,550, filed on Sep. 21, 2017, provisional application No. 62/561,559, filed on Sep. 21, 2017.

(56) References Cited

U.S. PATENT DOCUMENTS

| | | | |
|---|---|---|---|
| 3,861,639 | A | 1/1975 | Morrill |
| 4,100,684 | A | 7/1978 | Berger |
| 4,207,646 | A | 6/1980 | Osborne |
| 4,262,874 | A | 4/1981 | Seigh |
| 4,315,615 | A | 2/1982 | Scocozza |
| 4,415,092 | A | 11/1983 | Boyer |
| 4,437,639 | A | 3/1984 | Stein |
| 4,875,591 | A | 10/1989 | Mikesell |
| 5,037,702 | A * | 8/1991 | Pitts ............... D21H 25/06 427/372.2 |
| 5,072,483 | A | 12/1991 | Durand |
| D333,085 | S | 2/1993 | Thomsen |
| 5,249,765 | A | 10/1993 | Garcia |
| 5,269,083 | A | 12/1993 | Vampatella et al. |
| 5,425,524 | A | 6/1995 | Messina, Jr. |
| 5,432,973 | A | 7/1995 | Wagner et al. |
| 5,605,313 | A | 2/1997 | Erickson et al. |
| 5,775,919 | A | 7/1998 | Gardner |
| 5,836,038 | A | 11/1998 | Thorp |
| 5,947,304 | A | 9/1999 | Thorp |
| 6,007,891 | A | 12/1999 | Davis et al. |
| 6,056,468 | A | 5/2000 | Niewiadomski |
| 6,186,461 | B1 | 2/2001 | Pelaez |
| 6,719,260 | B1 | 4/2004 | Hart |
| 6,793,430 | B1 | 9/2004 | Liu |
| 6,945,414 | B1 | 9/2005 | Stevens et al. |
| 7,309,181 | B2 | 12/2007 | Hawkins |
| 7,891,124 | B1 | 2/2011 | Willis |
| 7,967,520 | B2 | 6/2011 | Hawkins |
| 8,032,966 | B1 | 10/2011 | Keller |
| 8,141,838 | B2 | 3/2012 | Johnson et al. |
| D663,776 | S | 7/2012 | Lira-Nunez et al. |
| D669,937 | S | 10/2012 | Lira-Nunez et al. |
| 8,544,805 | B2 | 10/2013 | Virgin |
| 8,641,001 | B2 | 2/2014 | Heffernon |
| 8,757,568 | B2 | 6/2014 | Ko |
| 9,395,044 | B2 | 7/2016 | Cheng |
| 9,409,437 | B2 | 8/2016 | Green et al. |
| 9,486,082 | B2 | 11/2016 | Warncke et al. |
| 9,974,399 | B1 | 5/2018 | Tanger et al. |
| 10,349,759 | B2 | 7/2019 | Wiggins |
| 10,753,100 | B2 * | 8/2020 | Kim ..................... B32B 7/12 |
| 11,179,964 | B2 * | 11/2021 | Franco ................ B32B 7/12 |
| 2002/0068163 | A1 * | 6/2002 | McDuff ............... B32B 5/18 428/319.1 |
| 2002/0160352 | A1 | 10/2002 | Beno |
| 2006/0003307 | A1 | 1/2006 | Hester et al. |
| 2006/0024463 | A1 | 2/2006 | Gustafson et al. |
| 2006/0186304 | A1 | 8/2006 | McGee |
| 2007/0186384 | A1 | 8/2007 | Broehl et al. |
| 2008/0120922 | A1 | 5/2008 | Sullivan et al. |
| 2008/0166173 | A1 | 7/2008 | Gibbons |
| 2009/0193629 | A1 | 8/2009 | Suenaga |
| 2009/0250575 | A1 | 10/2009 | Fullerton et al. |
| 2010/0068422 | A1 | 3/2010 | Keyes |
| 2011/0159225 | A1 | 6/2011 | Boyle et al. |
| 2012/0112022 | A1 | 5/2012 | Cheng |
| 2012/0168580 | A1 * | 7/2012 | Mackey ............... F16B 47/00 248/205.5 |
| 2013/0074299 | A1 | 3/2013 | Rojdev |
| 2014/0265765 | A1 | 9/2014 | Khodapanah et al. |
| 2014/0377736 | A1 | 12/2014 | Essen et al. |
| 2016/0073796 | A1 | 3/2016 | Nesbitt |
| 2018/0125269 | A1 | 5/2018 | Smeja |
| 2018/0134067 | A1 | 5/2018 | Jennings |
| 2018/0311995 | A1 * | 11/2018 | Pañeda Palacio ...... F16B 47/00 |

\* cited by examiner

MICRO-SUCTION REUSABLE AND REPOSITIONABLE WRITING SURFACES

CROSS REFERENCE TO RELATED APPLICATIONS

This application is a continuation of U.S. patent application Ser. No. 16/112,630 entitled "MICRO-SUCTION REUSABLE AND REPOSITIONABLE WRITING SURFACES," filed on Aug. 24, 2018, which claims the benefit of priority to United States Provisional Patent Applications Nos. 62/561,550, 62/561,559, 62/561,570, 62/561,581 and 62/561,568 all filed Sep. 21, 2017, incorporated herein by reference in their entirety.

FIELD OF THE INVENTION

The present invention generally relates to flexible marking surfaces and more particularly related to reusable and repositionable writing surfaces featuring micro-suction characteristics.

BACKGROUND OF THE INVENTION

Despite the popularity of digital communications and word processing, the traditional tools of paper and writing instruments remain preferable in many circumstances. The ubiquitous paper sticky note has been in popular use for years. For example, 3M "post-it" brand paper sticky notes and similar concepts (referred to herein as "post-it notes") allow people to quickly take notes and stick the notes to various things, such as physical desks, physical folders, equipment, walls, and the like.

When thoughts run through an individual's head it is sometimes useful to jot them down so as not to forget them. For example, at home, or at work, an individual may remember tasks that he has to complete, groceries he needs to purchase, or information that needs to be remembered, and he will scribble notes on a napkin or sheet of paper and stuff it in a pocket. Such processes are also useful during team brainstorm sessions, wherein a multitude of people engage team ideation in real time.

Post-it notes are generally used to remind the creator of the note of specific work tasks. Pocket notes and loose sheets of paper, in contrast, are easily misplaced, and seldom available when later needed. However, a problem remaining with such pocket notes, loose sheets of paper, and post-it notes is that they are not reusable. For instance, 50 billion post-it notes are thrown into landfills every year. This waste corresponds to 250,000 trees cut annually. A factor contributing to the reckless disposal of post-it notes is that once post-it notes lose their ability to stick, much of their usefulness is lost.

Notes often accompany daily tasks. In many contexts, it would be helpful to write to down the measurements, but a sheet of paper and a pen may not be readily available for a user. Moreover, in a variety of contexts, notes lacking adhesive backing are then pasted using tapes or adhesives. A problem encountered during such ad-hoc usage is that there is not enough side surface area of such tapes to grab and peel, leaving people frustrated when trying to move thin, fully-sticking notes around a wall.

Some configurations of post-it notes contain adhesive with temporarily reusable adhesive properties. However, if the adhesive is too strong, for instance, the material becomes too difficult to remove. If the adhesive is too weak, the material will not remain adhered to the surface. Residue left following placement and removal also remains a problem. Additionally, even reusable adhesives have a limited lifespan. For example, once an adhesive surface as typically known in the prior art gets a little dust on it, the adhesive stops sticking as intended.

It would be greatly advantageous to provide an alternative to paper notes, therefore, by offering a writing surface that is reusable and repositionable. A need remains for the writing surface to adhere to a surface without leaving residue. Furthermore, a need remains for a note capture mechanism to reusably stick to a variety of surfaces.

SUMMARY OF THE INVENTION

In accordance with teachings of the present invention, a micro-suction reusable and repositionable writing surfaces is provided.

An object of the present invention is to provide a writing board attached to a surface. The writing board includes a closed-cell vinyl foam, a water-tight and/or air-tight flexible coating, a temporary backing film, an erase film, and an adhesive layer. The writing board further includes a second temporary backing film.

The vinyl foam includes a top surface and a microscopic caverns surface on the opposite side. The flexible coating is placed on the microscopic cavernous surface to render the vinyl foam air-tight. The temporary backing film covers the microscopic cavernous surface coated with the flexible coating. A user peels of the temporary backing film to firmly attach the vinyl foam to the surface.

The erase film is attached to the uncoated area of the vinyl foam. The erase film allows the user to write and erase content. In various embodiments, the erase film could be characterized as a "dry-erase" or "wet-erase" film as readily understood by those skilled in the art. The adhesive layer attaches the erase film to the top surface of the vinyl foam. The writing board may be attached to any surface such as metal, wood, walls etc.

Another object of the present invention is to provide the writing board with a second temporary backing film to laminate the adhesive layer. Further, the length and width of vinyl foam matches with the erase film.

Another object of the present invention is to provide the writing board wherein the width and length of the vinyl foam is 56" and 150" respectively. Further, the combine size of the vinyl foam and the erase film is between 5" to 45".

Another object of the present invention is to provide a method for creating a writing board that includes the steps of coating the rear end of a vinyl foam with a flexible coating to create air-tight microscopic caverns, laminating the rear end of the vinyl foam with a temporary backing film, coating the top end of the vinyl foam with an adhesive, pasting an erase film on the adhesive matching the size of the vinyl foam, cutting the vinyl foam and the erase film to a desired width, and peeling away the temporary backing film to attach the erase film to an object.

The foregoing and other advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

Examples of the present invention are directed to re-useable writing surfaces that may be removably coupled to a variety of surfaces, and associated assemblies and methods thereof.

In one example, a re-useable writing surface is disclosed. The re-useable writing surface includes a porous layer having a first surface and a second surface opposite the first surface, the porous layer also defines one or more cells. A non-adhesive coating is applied to the second surface of the porous layer and a writeable layer is coupled to the first surface of the porous layer. The writeable layer is configured to allow a user to write and erase content. The non-adhesive coating enables the re-useable writing surface to reusably and removably couple to exterior surfaces.

There may be further re-useable writing surface examples where the non-adhesive coating seals at least a subset of cells of the one or more cells, and the non-adhesive coating may establish an airtight or watertight seal over the subset of cells. The non-adhesive coating may be defined as one or more of liquefied rubber sealants, rubberized sealants, silicone sealants, or polysiloxane coatings. The porous layer may be a closed-cell foam and the closed-cell foam may be one or more of closed-cell polyvinyl chloride, vinyl foam, acrylic, or PVC foam. The writeable layer may be a dry or wet erase surface. There may also be an additional layer, an adhesive layer, positioned between the first surface of the porous layer and the writeable layer, the adhesive layer coupling the writeable layer to the porous layer.

In another example, a re-useable writing surface is disclosed. The re-useable writing surface includes a coupling layer having a first side and a second side opposite the first side, the coupling layer defining a plurality of cells. The re-useable writings surface further includes a non-adhesive coating applied to the second side of the coupling layer, sealing a subset of the plurality of cells, and a writeable layer, the writeable layer coupled to the first side of the coupling layer. The writeable layer allows a user to write draft and erase content. The non-adhesively coated second side of the coupling layer removably and reusably couples the writing surface to an exterior surface.

There may be further re-useable writing surfaces where the subset of the plurality of cells are airtight and watertight based on a sealing property of the non-adhesive coating. The writeable layer may define a dry or wet erase surface. The coupling layer and writeable layer may be coextensive. The exterior surfaces that the re-useable writing surface may couple to may include woods, metals, and walls. The non-adhesive coating may include an elastomeric sealant. The re-useable writing surface may be elastically deformable. The coupling layer material may be a vinyl closed-cell foam.

In another example, a method for creating a re-useable writing surface is disclosed. The method includes the steps of coating a first surface of a porous layer with a non-adhesive coating, the porous layer including the first surface and a second surface opposite the first surface, the porous layer further defining a plurality of cells, and where the non-adhesive coating seals at least a subset of the plurality of cells of the first surface. The method further includes coupling a writeable layer to the porous layer, where the writeable layer is coupled to the second surface of the porous layer, and where the writeable layer allows a user to write and erase content, and where the coated first surface removably and reusably couples the re-usable writing surface to one or more exterior surfaces.

The method for creating a re-useable writing surface may further include, rendering the plurality of cells airtight or watertight using the non-adhesive coating. The method may further include arranging the writeable layer to be coextensive with the porous layer. The method may further include coupling the writeable layer to the second surface of the porous layer using an adhesive.

In addition to the exemplary aspects and embodiments described above, further aspects and embodiments will become apparent by reference to the drawings and by study of the following description.

DETAILED DESCRIPTION OF DRAWINGS

Figure 1:
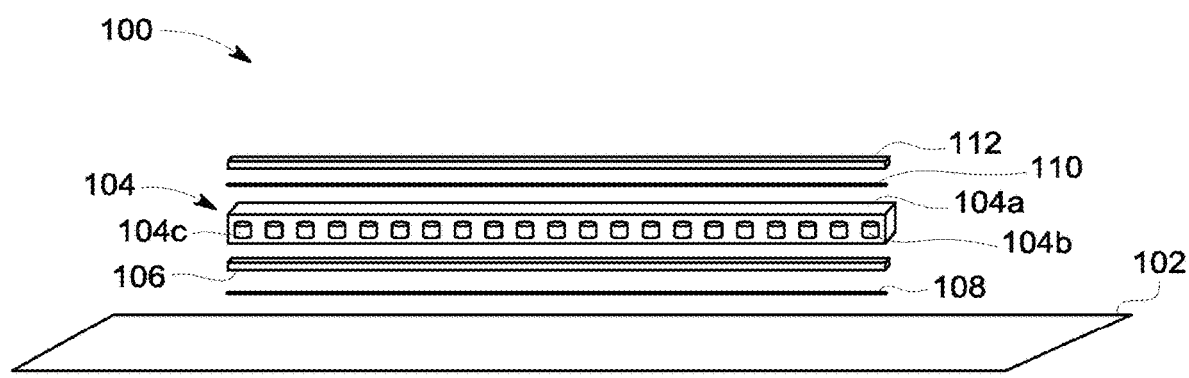
FIG. 1 illustrates a side exploded view of a writing board attached to a surface in accordance with a preferred embodiment of the present invention.

While this technology is illustrated and described in a preferred embodiment, a writing board may be produced in many different configurations, forms, shapes, color and sizes. This is depicted in the drawings and will be described in detail, as a preferred embodiment of the invention, with the understanding that the present disclosure is to be considered as an exemplification of the principles of the invention and the associated functional specifications for its construction. It is not intended to limit the invention to the embodiment illustrated. Those skilled in the art will envision many other possible variations within the scope of the technology described herein.

FIG. 1 illustrates a side exploded view of a writing board 100 attached to a surface 102 in accordance with a preferred embodiment of the present invention. The writing board 100 includes a vinyl foam 104, a flexible coating 106, a temporary backing film 108, an erase film 112, and an adhesive layer 110. Examples of the surface 102 include but not limited to wooden, metal, walls etc.

The vinyl foam 104 includes: a top surface 104a and a microscopic cavernous surface 104b, 104c. In an embodiment, the microscopic caverns are only included on one side of the vinyl foam. In an embodiment, the microscopic cavernous surface 104b, 104c is intended to be coated with a flexible coating 106. In a preferred embodiment of the present invention, the description of the vinyl foam 104 is closed cell, black, glossy and polyvinyl chloride. Further the foam density is approximately 9.0 lbs/ft$^3$, foam tensile strength is 50 psi and foam elongation is 250%.

It would be readily apparent to those skilled in the art that various other foam description, foam density, foam tensile strength and foam elongation may be envisioned without deviating from the scope of the present invention. Examples of the vinyl foam 104 include but not limited to acrylic or PVC foam with microscopic crevasses.

The flexible coating 106 is coated on the microscopic cavernous surface 104b, 104c to render the vinyl foam 104 air-tight. Examples of the flexible coating 106 include but not limited to liquified rubber sealants, rubberized sealants, silicone sealants, and polysiloxane coatings etc.

The temporary backing film 108 covers the microscopic cavernous surface 104b, 104c coated with the flexible coating 106. A user peels off the temporary backing film 108 to firmly attach the vinyl foam 104 to the surface 102. Examples of the temporary backing film 108 include but are not limited to wax-coated paper, silicone coated paper, super, calendered kraft paper, glassine, clay coated kraft paper, machine finished kraft paper, machine glazed paper. The temporary backing film 108 and the microscopic end vinyl foam 104 is shown and explained in detail in conjunction with FIG. 3 of the present invention.

The erase film 112 is attached to the top surface 104a of the vinyl foam 104. The erase film 112 allows the user to write and erase content. Examples of the erase film 112 include but are not limited to PET or polyethylene, or any other similar dry erase film, wet erase film etc. The erase film 112 is shown and explained in detail in conjunction with FIG. 2 of the present invention.

The adhesive layer 110 attaches the erase film 112 to the top surface 104a of the vinyl foam 104. Examples of the adhesive layer 110 include but are not limited to solvent-synthetic resins, cyanoacrylates, acrylics, anarobics, silicones, or urethanes.

Figure 2:
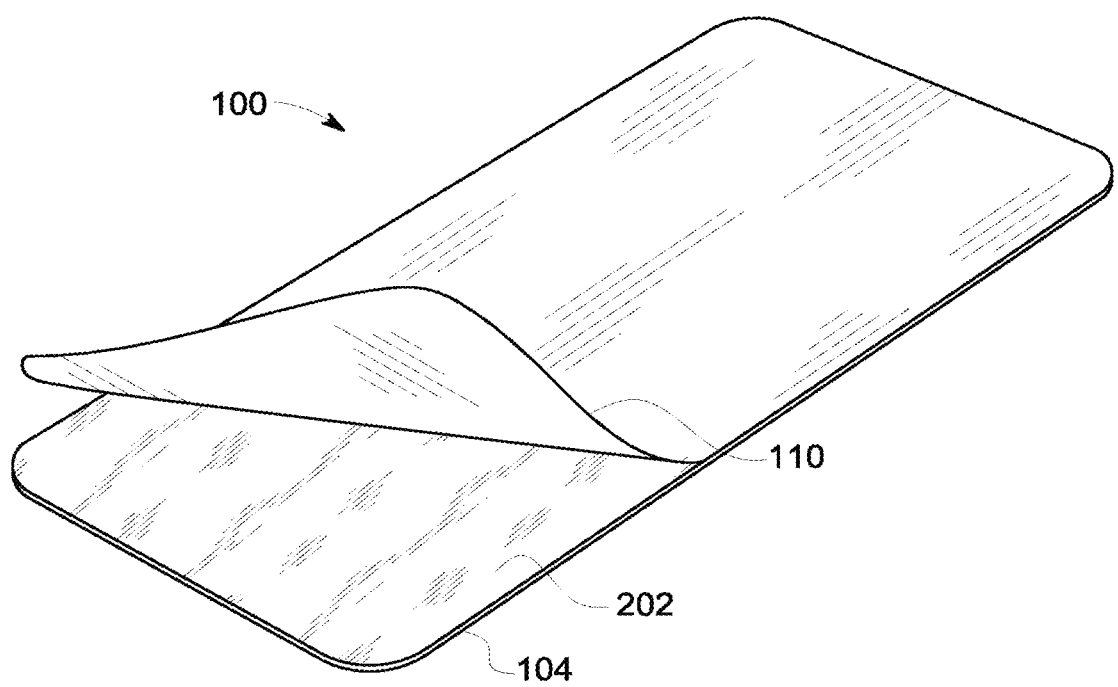
FIG. 2 illustrates a front perspective view of the writing board in accordance with a preferred embodiment of the present invention.

FIG. 2 illustrates a front perspective view of the writing board 100 in accordance with a preferred embodiment of the present invention. The erase film 110 allows the user to write or erase content such as notes or instructions. The notes or instructions may be either images or text. The length and width of the erase film 110 matches with the length and width of the vinyl foam 104. The combined size of the vinyl foam 104 and the erase film 110 ranges between 5" and 45" in length.

In another preferred embodiment of the present invention, the writing board 100 further includes a secondary temporary backing film 202 to laminate the adhesive layer. Examples of the temporary backing film (108, shown in FIG. 1 and FIG. 3) and the second temporary backing film 202 include but not limited to wax-coated paper, silicone coated paper, super, calendered kraft paper, glassine, clay coated kraft paper, machine finished kraft paper, machine glazed paper.

Figure 3:
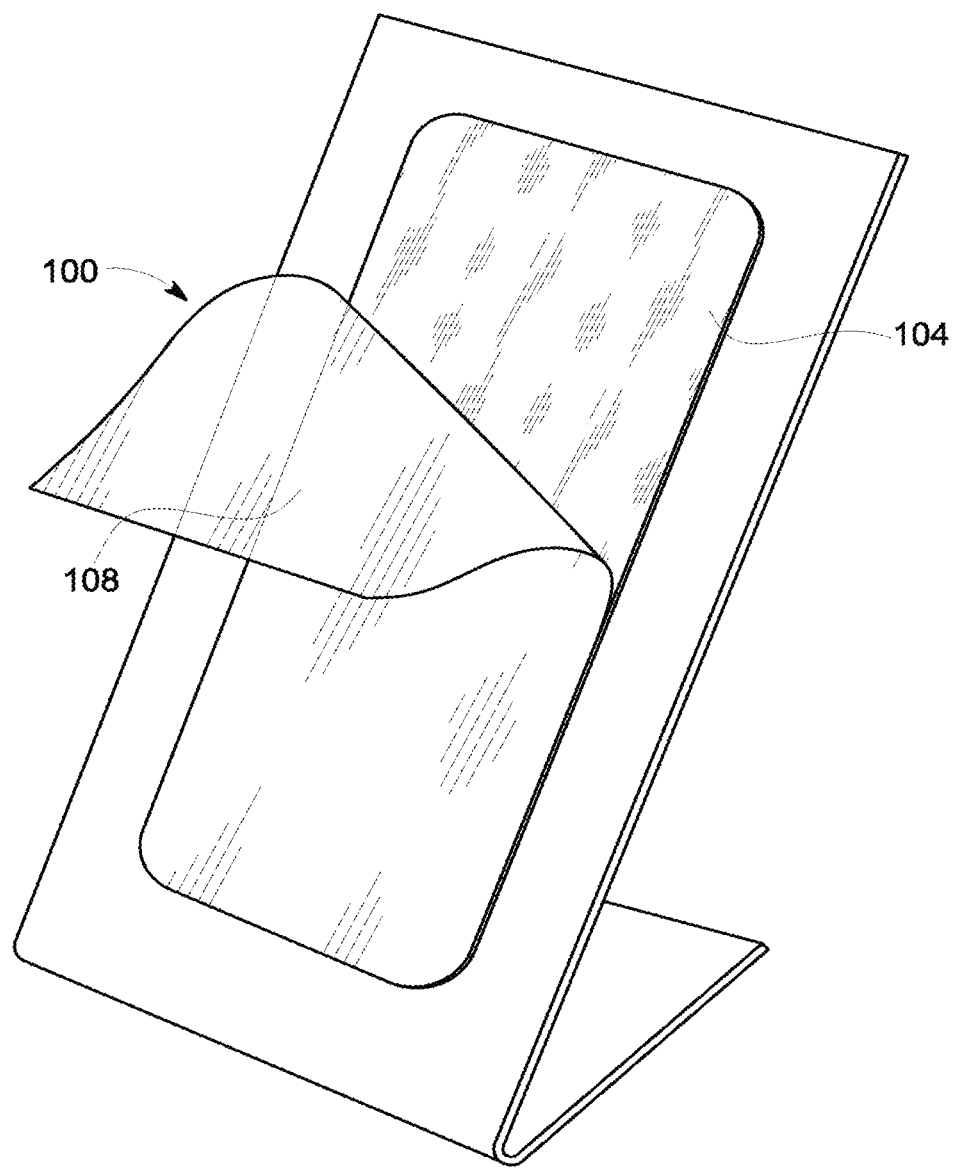
FIG. 3 illustrates a side perspective view of the writing board in accordance with a preferred embodiment of the present invention.

FIG. 3 illustrates a side perspective view of the writing board 100 in accordance with a preferred embodiment of the present invention. The temporary backing film 108 is peeled off by the user to attach the vinyl foam 104 to a surface 102. The microscopic caverns contain tiny pockets with a specially formulated laminated skin that creates suction coupling the vinyl foam 104 to a surface 102.

In an exemplary embodiment of the present invention, the width and the length of the writing board 100 is 56" and 150" respectively. It would be readily apparent to those skilled in the art that various shapes and sizes of the writing board 100 may be envisioned without deviating from the scope of the present invention.

The thickness of the writing board 100 in some embodiments must be at least 0.05" to allow for usability, die cut and creation of custom shapes. Examples of the shapes of the writing board 100 include but are not limited to arrows, human figures for anatomy, custom cut to fit a specific wall space, geometrical shapes etc.

Figure 4:
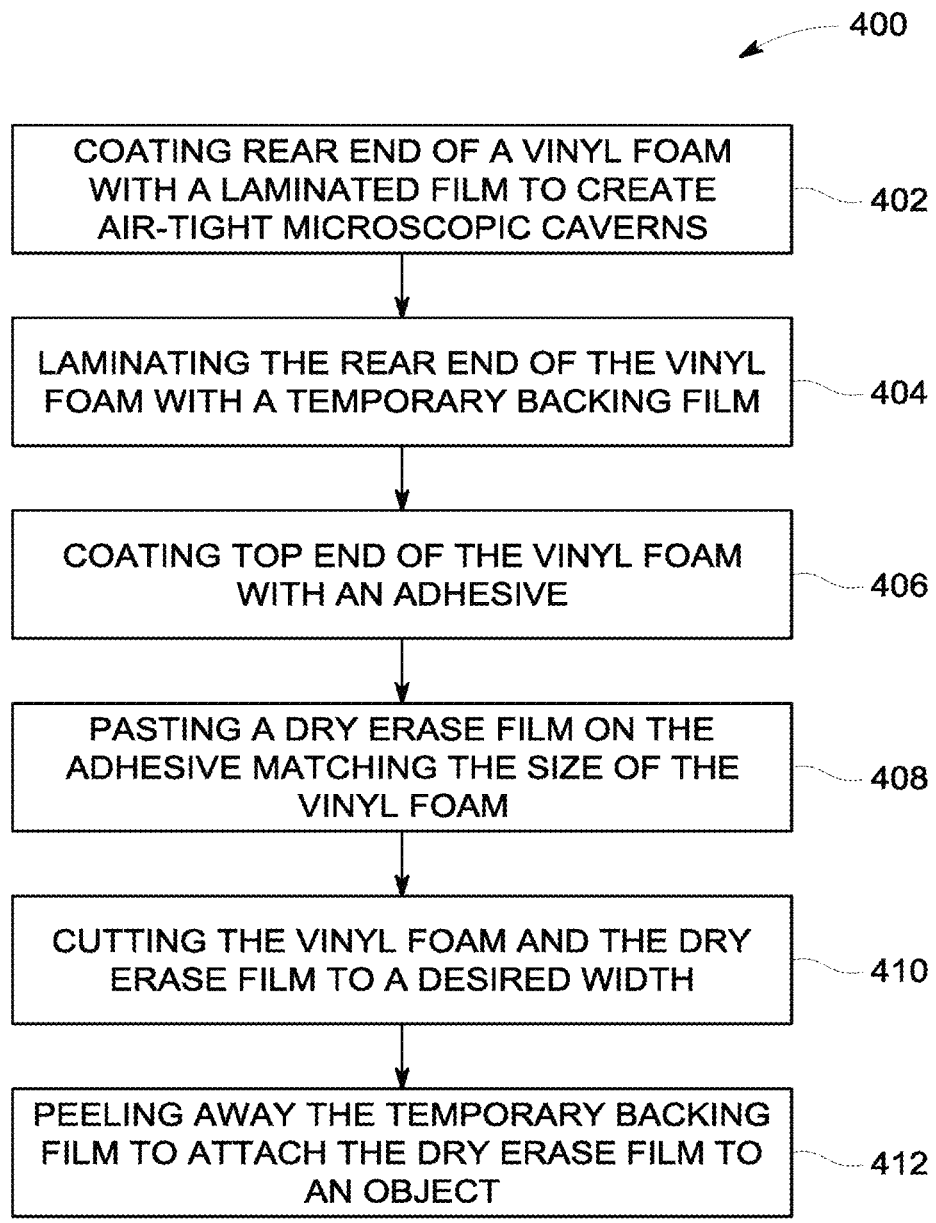
FIG. 4 illustrates a flowchart for a method for creating a writing board in accordance with another preferred embodiment of the present invention.

FIG. 4 illustrates a flowchart for a method 400 for creating a writing board in accordance with another preferred embodiment of the present invention. The method 400 initiates with a step 402 of coating rear end of a vinyl foam with a flexible coating to create air-tight microscopic caverns. The step 402 is followed by a step 404 of laminating the rear end of the vinyl foam with a temporary backing film.

The step 404 is followed by a step 406 of coating top end of the vinyl foam with an adhesive. The step 406 is followed by a step 408 of pasting a erase film on the adhesive matching the size of the vinyl foam. The adhesive should be suitable to use with the erase film.

The step 408 is followed by a step 410 of cutting the vinyl foam and the erase film to a desired width. In an exemplary embodiment of the present invention, the desired width is 5.25", 11", 22" and 44". The step 410 is followed by a step 412 of peeling away the temporary backing film to attach the vinyl foam to an object.

The vinyl foam, the flexible coating, the temporary backing film, the adhesive and the erase film are explained in detail in with conjunction with FIG. 1 to FIG. 3 of the present invention. In another preferred embodiment of the present invention, the method 400 further includes a step of laminating the adhesive between the erase film and the vinyl foam with another temporary backing film.

The writing board is cut into a desired length. The writing board is then die-cut into the desired shape. The shape of the writing board is generally a square or rectangular in ratio of 4:3, 16:9 and 2:1. Finally, the writing board is a clean-edged sticker with at least 1 mm thickness and exhibits a balanced mix of rigidity and flexibility similar to that of a 2 mm thickness.

The present invention offers various advantages such as durability of the writing board to be reused multiple times. The present invention further provides the writing board with zero-adhesive attaching to a surface. The zero-adhesive results in providing excellent sticking power even when the material is washed with water. The present invention provides a portable writing board to be attached to any surface and to be used for longer time.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. A re-useable writing surface, the re-useable writing surface comprising:
    a porous layer comprising a closed-cell foam having a first surface and a second surface opposite the first surface, the second surface comprising a plurality of microscopic cavernous pockets;
    a non-adhesive coating comprising one or more of a liquefied rubber sealant, rubberized sealant, silicone sealant, or polysiloxane coating applied to the second surface of the porous layer; and
    a writeable layer coupled to the first surface of the porous layer by an adhesive, the writeable layer configured to allow a user to write and erase content, wherein the writable layer and the porous layer are coextensive;
    wherein the non-adhesive coating establishes an airtight or watertight seal over a subset of microscopic cavernous pockets and enables the re-useable writing surface to reusably and removably couple to exterior surfaces by suction.

2. The re-useable writing surface of claim 1, wherein the closed-cell foam is defined as one or more of polyvinyl chloride foam, vinyl foam, or acrylic foam.

3. The re-useable writing surface of claim 1, wherein the writeable layer defines a dry or wet erase surface.

4. The re-useable writing surface of claim 1, further comprising a temporary backing layer removably coupled to the non-adhesively coated second side of the coupling layer.

5. The re-useable writing surface of claim 4, wherein the temporary backing layer comprises at least one of wax-coated paper, silicone coated paper, calendared kraft paper, glassine, clay coated kraft paper, machine finished kraft paper, or machine glazed paper.

6. A re-useable writing surface comprising:
- a coupling layer comprising a closed-cell foam having a first side and a second side opposite the first side, the coupling layer defining a plurality of microscopic cavernous pockets positioned on the second side thereof;
- a non-adhesive coating comprising one or more of a liquefied rubber sealant, rubberized sealant, silicone sealant, or polysiloxane coating applied to the second side of the coupling layer, sealing a subset of the plurality of microscopic cavernous pockets;
- a writeable layer, the writeable layer coupled to the first side of the coupling layer by an adhesive, the writeable layer allowing a user to draft and erase content, wherein the writable layer and the coupling layer are coextensive; and
- wherein the non-adhesively coated second side of the coupling layer removably and reusably couples the writing surface to an exterior surface by microsuction.

7. The re-useable writing surface of claim 6, wherein the subset of the plurality of microscopic cavernous pockets are rendered airtight or watertight based on a sealing property of the non-adhesive coating.

8. The re-useable writing surface of claim 6, wherein the writeable layer defines a dry or wet erase surface.

9. The re-useable writing surface of claim 6, wherein the exterior surfaces include woods, metals, and walls.

10. The re-useable writing surface of claim 6, wherein the re-useable writing surface is elastically deformable.

* * * * *